(12) United States Patent
Canepa et al.

(10) Patent No.: US 12,455,170 B2
(45) Date of Patent: Oct. 28, 2025

(54) METHOD AND SYSTEM FOR ASSISTING IN THE ELECTRIC ENERGY MANAGEMENT OF A VEHICLE OF ELECTRIC OR HYBRID TYPE, VEHICLE, AND SOFTWARE PROGRAM

(71) Applicant: ALTRA S.P.A., Genoa (IT)

(72) Inventors: Alessio Canepa, Genoa (IT); Marco Aimo Boot, Genoa (IT); Alessandro Bernardini, Genoa (IT); Paolo Gastaldo, Genoa (IT); Edoardo Ragusa, Genoa (IT)

(73) Assignee: ALTRA S.P.A., Genoa (IT)

( * ) Notice: Subject to any disclaimer, the term of this patent is extended or adjusted under 35 U.S.C. 154(b) by 227 days.

(21) Appl. No.: 18/036,044

(22) PCT Filed: Nov. 12, 2021

(86) PCT No.: PCT/IB2021/060514
§ 371 (c)(1),
(2) Date: May 9, 2023

(87) PCT Pub. No.: WO2022/101847
PCT Pub. Date: May 19, 2022

(65) Prior Publication Data
US 2024/0019259 A1    Jan. 18, 2024

(30) Foreign Application Priority Data
Nov. 12, 2020   (IT) ...................... 102020000027146

(51) Int. Cl.
*G01C 21/34*    (2006.01)
*B60L 15/20*    (2006.01)
*B60W 20/12*    (2016.01)

(52) U.S. Cl.
CPC ...... *G01C 21/3469* (2013.01); *B60L 15/2045* (2013.01); *B60W 20/12* (2016.01); *B60W 2510/244* (2013.01)

(58) Field of Classification Search
CPC .............. G01C 21/3469; B60W 20/12; B60W 2510/244; B60L 15/2045
(Continued)

(56) References Cited
U.S. PATENT DOCUMENTS 8,086,364 B2 * 12/2011 Xue .................. B60W 10/08
701/484
8,412,476 B2 * 4/2013 Kato .................. B60L 1/00
320/112
(Continued)

OTHER PUBLICATIONS

International Search Report and Written Opinion in corresponding International Patent Application No. PCT/IB2021/060514, mailed Feb. 14, 2022 (14 pages).

*Primary Examiner* — Luis A Martinez Borrero
(74) *Attorney, Agent, or Firm* — Leason Ellis LLP

(57) ABSTRACT

Method for assisting in the management of the electric energy of an electric or hybrid vehicle, comprising the steps of: providing a graph including a plurality of nodes belonging to one or more branches of the graph; iteratively performing the following steps: acquiring current geographical geolocation coordinates of the vehicle; identifying, on the graph, a node geographically closer to said current geographical coordinates; identifying, based on said node closer to the current geographical coordinates, which branch of the graph the vehicle is travelling; acquiring the energy consumption information associated with the branch that the vehicle is travelling; checking whether a current electrical charge of the batteries of the vehicle allows the vehicle to
(Continued)

reach the respective arrival charging station of the branch the vehicle is travelling; and generating a feedback signal as a function of said check.

23 Claims, 4 Drawing Sheets

(58) Field of Classification Search
USPC .......................................................... 701/22
See application file for complete search history.

(56) References Cited

U.S. PATENT DOCUMENTS

| | | | |
|---|---|---|---|
| 8,527,121 B2* | 9/2013 | Tate, Jr. ................... | B60L 50/62 |
| | | | 701/29.3 |
| 8,698,642 B2* | 4/2014 | Taguchi .................... | B60L 3/12 |
| | | | 340/636.11 |
| 9,045,126 B2* | 6/2015 | Harty ...................... | B60W 20/00 |
| 10,082,400 B2* | 9/2018 | Gutruf ................... | B60W 10/26 |
| 10,160,339 B2* | 12/2018 | Ricci ................... | G01C 21/3469 |
| 2002/0188387 A1* | 12/2002 | Woestman ............. | B60L 50/16 |
| | | | 180/65.235 |
| 2007/0294026 A1* | 12/2007 | Schirmer ........... | G01C 21/3469 |
| | | | 340/995.19 |
| 2008/0021628 A1* | 1/2008 | Tryon ................... | B60W 20/00 |
| | | | 701/99 |
| 2010/0106401 A1* | 4/2010 | Naito ...................... | B60L 53/00 |
| | | | 701/533 |
| 2011/0022259 A1* | 1/2011 | Niwa .................. | G01C 21/3415 |
| | | | 903/903 |
| 2011/0032110 A1* | 2/2011 | Taguchi .................... | B60L 3/12 |
| | | | 340/636.1 |
| 2011/0246010 A1* | 10/2011 | de la Torre Bueno . | B60L 50/61 |
| | | | 903/902 |
| 2011/0246019 A1 | 10/2011 | Mineta | |
| 2013/0116870 A1* | 5/2013 | Harty .................... | B60W 20/12 |
| | | | 903/903 |
| 2013/0218458 A1* | 8/2013 | Scholl ..................... | B60L 58/12 |
| | | | 701/461 |
| 2013/0226441 A1* | 8/2013 | Horita ................ | G01C 21/3469 |
| | | | 701/117 |
| 2013/0238163 A1 | 9/2013 | Onogi | |
| 2015/0149078 A1 | 5/2015 | Profous et al. | |
| 2015/0217779 A1* | 8/2015 | Schmoll Genannt Eisenwerth .... | |
| | | | B60W 20/10 |
| | | | 180/65.265 |
| 2015/0298565 A1* | 10/2015 | Iwamura ................ | G06Q 10/04 |
| | | | 701/22 |
| 2016/0325637 A1* | 11/2016 | Payne ..................... | B60L 50/16 |
| 2017/0176200 A1* | 6/2017 | Jones .................. | G01C 21/3697 |
| 2020/0271470 A1* | 8/2020 | Symanow ............. | B60W 20/12 |
| 2021/0316713 A1* | 10/2021 | Vilar .......................... | B60L 1/20 |
| 2021/0389144 A1* | 12/2021 | Kim .................. | G01C 21/3691 |
| 2022/0032781 A1* | 2/2022 | Veltman .................. | B60L 50/60 |
| 2022/0178704 A1* | 6/2022 | Naef ................. | B60W 50/0097 |

* cited by examiner

METHOD AND SYSTEM FOR ASSISTING IN THE ELECTRIC ENERGY MANAGEMENT OF A VEHICLE OF ELECTRIC OR HYBRID TYPE, VEHICLE, AND SOFTWARE PROGRAM

CROSS-REFERENCE TO RELATED APPLICATIONS

This patent application is a U.S. National Phase Application under 35 U.S.C. § 371 of International Patent Application No. PCT/IB2021/060514, filed on Nov. 12, 2021, which claims priority from Italian patent application no. 102020000027146, filed on Nov. 12, 2020, all of which are incorporated by reference, as if expressly set forth in their respective entireties herein.

TECHNICAL FIELD

The invention relates to a method and a system for assisting in the management of electric energy of an electric or hybrid vehicle, to the electric or hybrid vehicle and to a software program loadable in storing means of the vehicle and designed to implement the method for assisting in the electric energy management.

KNOWN STATE OF THE ART

In recent years, the developments of navigation systems for cars (in general, for vehicles) have become more and more active and, as a matter of fact, said navigation system are now experiencing a widespread commercial utility. A navigation system of this type is provided with means for the detection of the current position of a car and with means for storing information of the road map.

For the detection of the current position of the vehicle, a GPS (Global Positioning System) navigation is generally used. With GPS navigation, a navigation system receives position information transmitted by satellites and, based on this information, detects the current position of the vehicle. A navigation system of this type is designed to display on a screen the current position of a vehicle, which was detected as described above, together with the best route selected based on a destination. Furthermore, the developed navigation systems include those capable of estimating the time needed to reach, from the current position of a vehicle, a destination along the best route and display it.

Simultaneously with the developments of these navigation systems, electric and hybrid cars now attract considerable attention from the point of view of environment protection, for the reduction of polluting emissions. In order to improve the utility of electric cars, the development of different technologies is underway. However, there are still several problems with electric cars in terms of practical application. For example, at the current stage, a battery acting as source of energy for an electric motor inevitably becomes heavier if its capacity has to be increased. Attempts to extend the range of an electric battery generally involve an increase in the ability to store energy on board the vehicle (e.g. by installing a larger battery), thus causing a significant increase in the weight of the vehicle and also an increase in the space needed for the installation of the battery. A large-sized battery jeopardizes the performances, the driving comfort and the loading capacity of the vehicle. The use of small-sized batteries solves the problems mentioned above, but limits the range of the charge cycle. Therefore, the residual capacity of a battery needs to be monitored so that the battery can be charged before its residual capacity gets below a given limit. Nowadays charging station are not sufficiently widespread yet and a significant amount of time is deemed to be necessary before they can reach a widespread distribution. Furthermore, the charge of a battery cannot be completed in a time that is as short as the one needed to refuel vehicles with an internal combustion engine.

Therefore, an electric car has to be properly charged in order to allow drivers to reach a chosen destination. In order to do so, the residual capacity of the battery has to be determined and the system also needs to establish whether the residual capacity is sufficient to reach the destination from the current position. To this aim, the battery consumption has to be predicted based on the driving plan of the driver. In order to predict the battery consumption up to the destination of the vehicle, the GPS navigation system described above can be used; said GPS navigation system, based on the state of charge of the battery, on the distance of the destination from the current position and on the mean or instantaneous consumption, estimates whether the destination can be reached with the current charge or if a charging cycle has to be carried out during the trip. This information, however, is generated depending on the current driving style of the driver, if necessary averaged along a given distance, and does not take into account possible changes in the driving style, which could lead to a consumption increase, such as for example the presence of uphill roads or unexpected situations.

Therefore, a system is needed, which is capable of predicting the actual future consumption, from the current position to the destination, regardless of the start-destination route set in a GPS navigation system or the like.

Driving prediction techniques are used to predict the distributions of the different future driving conditions, such as speed, acceleration, driver's behaviours, etc. The quality of the prediction results significantly affects the performances of the corresponding predictive energy management strategies, for example fuel saving, battery range, etc. Statistical methods are known, which are based, for example, on Markov chain, on artificial intelligence and on other mathematical models. However, known methods are hard to be engineered and be implemented and require a large computing power, which generally is not available in the electronic control units of the greatest part of commercial vehicles. The use of electronic control units with a lager computing power would increase the costs of the relative hardware.

Therefore, the object of the invention is to overcome the limits described above.

SUMMARY OF THE INVENTION

The aforesaid object is reached by a method for assisting in management of electric energy of an electric or hybrid vehicle, by a system for assisting in management of electric energy of an electric or hybrid vehicle, by a vehicle including the system for assisting in the management of the electric energy, and by a computer program product designed to implement the method for assisting in the management of the electric energy.

BRIEF DESCRIPTION OF THE DRAWINGS

For a better understanding of the present invention, in the following a preferred embodiment is described, which is provided by way of non-limiting example and with reference to the accompanying drawings, wherein.

DETAILED DESCRIPTION OF THE INVENTION

The method proposed according to the invention entails, in a possible embodiment, an algorithm for a hybrid or full electric vehicle, which is configured to learn and predict the driving habits of a driver of the vehicle, in terms of usual routes and relative statistics. The present invention can be applied both to known vehicles and to newly conceived vehicles.

Based on data at instants prior to a current instant and based on data of the current driving cycle, the method according to the invention provides a prediction of how much energy the vehicle will have to use until the next charge, so as to implement a specific strategy for the use of the energy of the batteries.

The method according to the invention makes use of a GPS receiver and of processing means (e.g. the electronic control unit of the vehicle), which do not require a large computing capacity. By using one or more items of information concerning: (i) state of the vehicle (moving vehicle, still vehicle, charging vehicle); (ii) battery energy consumption; and (iii) geographical position (e.g. from GPS), the method suggested herein builds a graph of historical paths between two consecutive battery charging events. The consumption data concerning each path is stored. During a new driving cycle, the existing path is explored in an efficient manner in order to output, recognizing the usual routes, the energy consumption expected until the next charge, including a relative output result confidence parameter.

Figure 1:
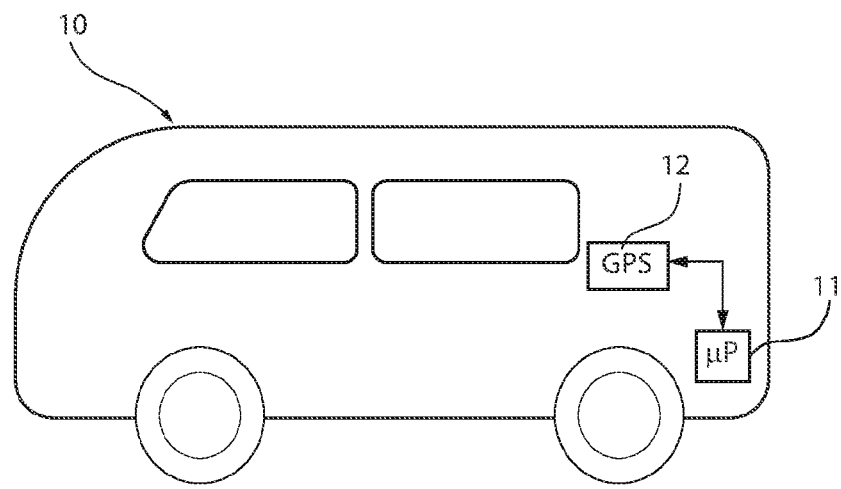
FIG. 1 shows an electric or hybrid vehicle provided with an electric energy management system according to the invention.

FIG. 1 shows an electric or hybrid vehicle 10.

Electric vehicle means, for example, a transportation means, which uses, in order to operate, an electric drive system, in which power is supplied by one or more batteries. Hybrid vehicle or, more accurately, hybrid drive vehicle means a vehicle provided with a drive system with two or more components, for example an electric engine and a heat engine, which work in combination with one another.

The vehicle 10 includes a processing unit 11 (for example, an electronic control unit of the vehicle 10 or a processing unit in addition to the electronic control unit) and GPS receiver 12 (or another geographical position detection tool, for example a generic georeferencing device). The processing unit 11 is provided with a microprocessor and with a memory, which are operatively coupled to one another. The memory can further be an external memory on the outside of the processing unit 11, which is coupled to the microprocessor in a known manner.

The vehicle 10 can be any mechanical means, which is driven or can be driven by human beings (or is remotely driven), is designed to transport people, animals or things, can circulate on roads or is suited for navigation.

Figure 2:
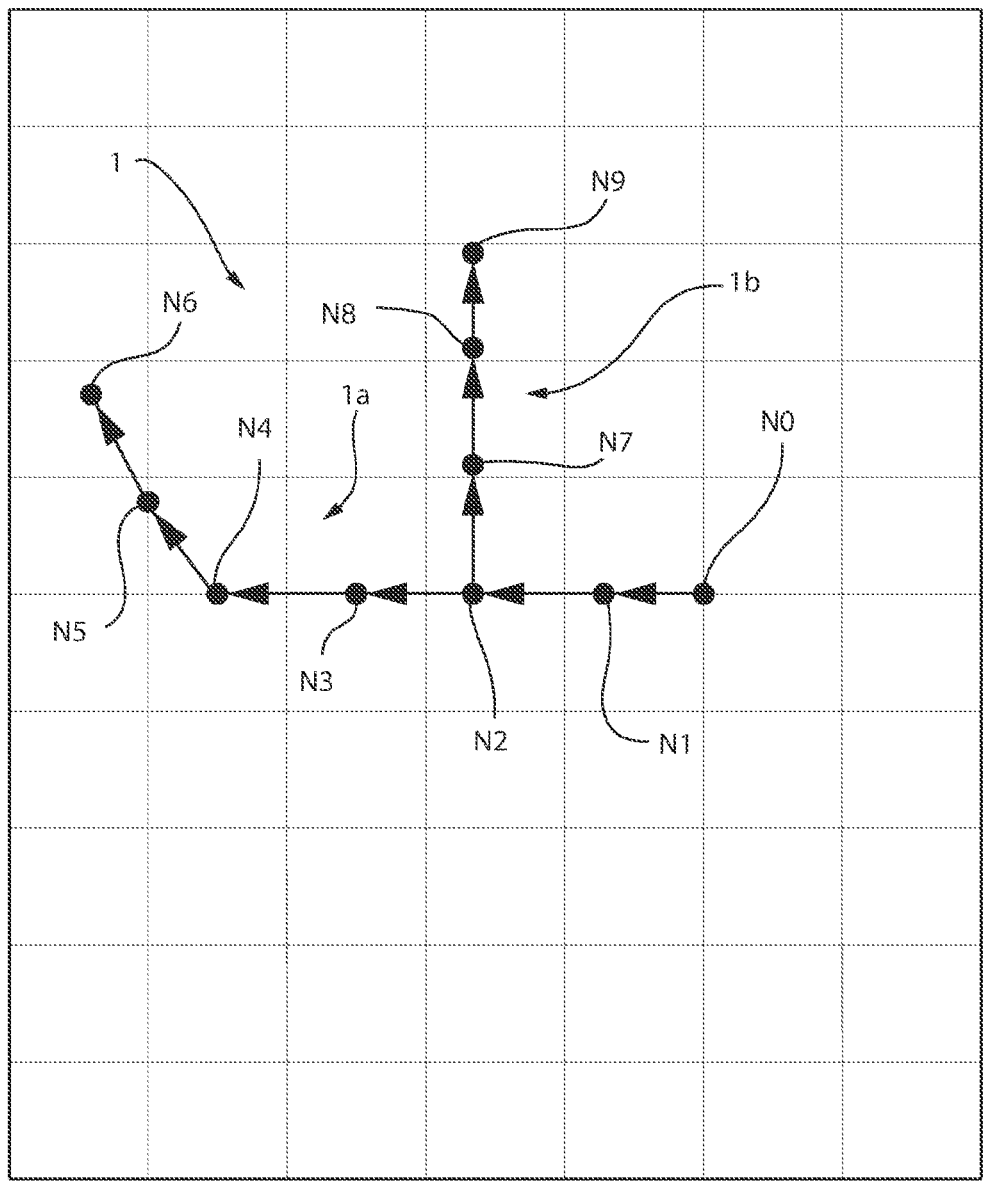
FIG. 2 shows a graph including a plurality of nodes corresponding to respective road routes that can be travelled by the vehicle of FIG. 1, according to an aspect of the invention.

FIG. 2 shows a graph 1 including a plurality of nodes N0-N9. The representation of FIG. 2 is purely indicative of a possible embodiment of the graph 1 and does not limit the invention. However, for the sake of simplicity and in order to make the description as clear as possible, graph 1 of FIG. 2 will be used hereinafter as base for the description of the invention. Graph 1 is stored in the memory of the processing unit 11 or in the external memory or in any other storing means that, in use, can be accessed by the processing unit 11.

Nodes N0-N6 identify a first path 1a that is travelled and/or can be travelled by the vehicle 10; nodes N0-N2 and N7-N9 identify a second path 1b that is travelled and/or can be travelled by the vehicle 10. Node N0 is a start node (prior to it, the vehicle was standing still, with the batteries charging), whereas nodes N6 and N9 are terminal nodes, which represent respective arrival points (destinations), in which the vehicle 10 can be charged again. Hence, both terminal nodes N6 and N9 are associated with charging points or stations for the vehicle 10.

Figure 3:
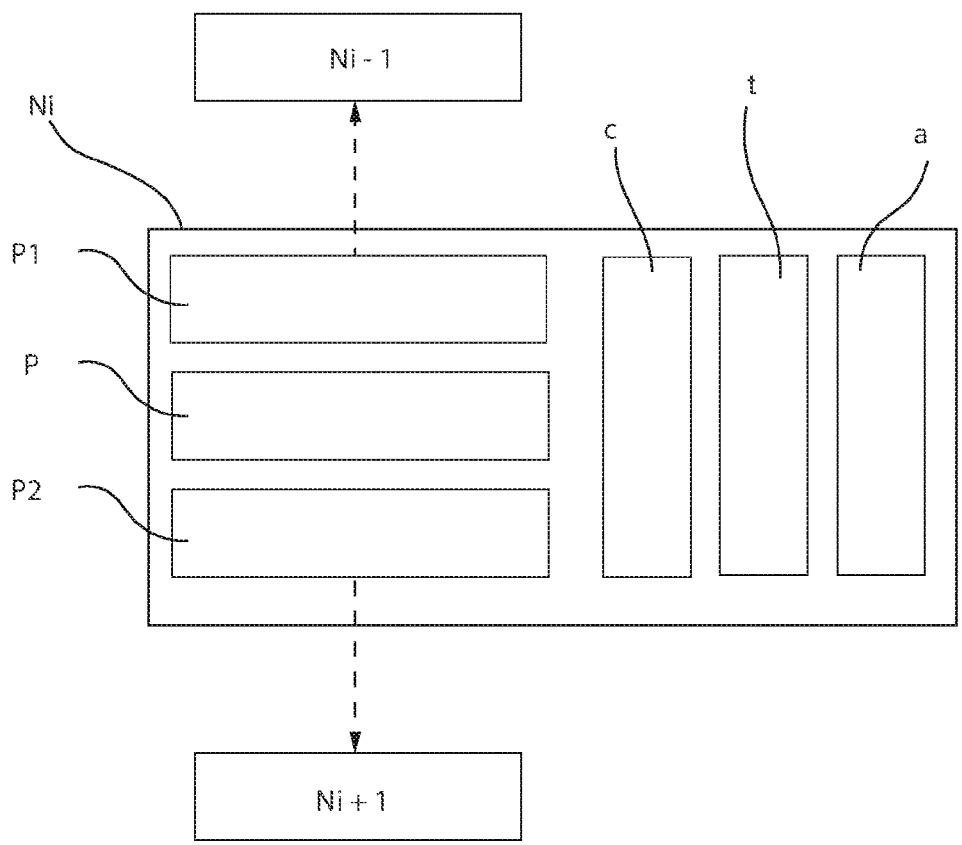
FIG. 3 shows a data structure representing one of the nodes of FIG. 2.

Each node N0-N9 is a software data stricture, can graphically be represented as shown in FIG. 3 (which shows an i-th node, with i=0-9) and includes: an antecedent field "f1"; one or more successor fields "f2"; a position field "p"; a termination field "t"; an age field "a"; and a consumption field "c".

The structure of the node of FIG. 2 can evidently be designed via software in a way that is obvious for a person skilled in the art, for example using object-oriented programming languages.

The antecedent field "f1" is, in particular, a pointer to a node immediately preceding, in the respective path 1a or 1b, node Ni (namely, node Ni−1); in case there is no node preceding Ni (such as, for example, in the case N0), this field f1 is set to a predetermined value indicative of this condition.

The successor field "f2" is, in particular, a pointer to a node immediately following, in the respective path 1a or 1b, node Ni (namely, node Ni+1); in case there is no node following Ni (such as, for example, in the case of a terminal node N6 of N9), this field f2 is set to a predetermined value indicative of this condition.

The position field "p" contains geographical coordinates (in particular GPS coordinates) of node Ni.

The termination field "t" contains a variable indicative of the fact that node Ni is or is not a terminal node (such as, for example, N6 or N9).

Figure 4A:
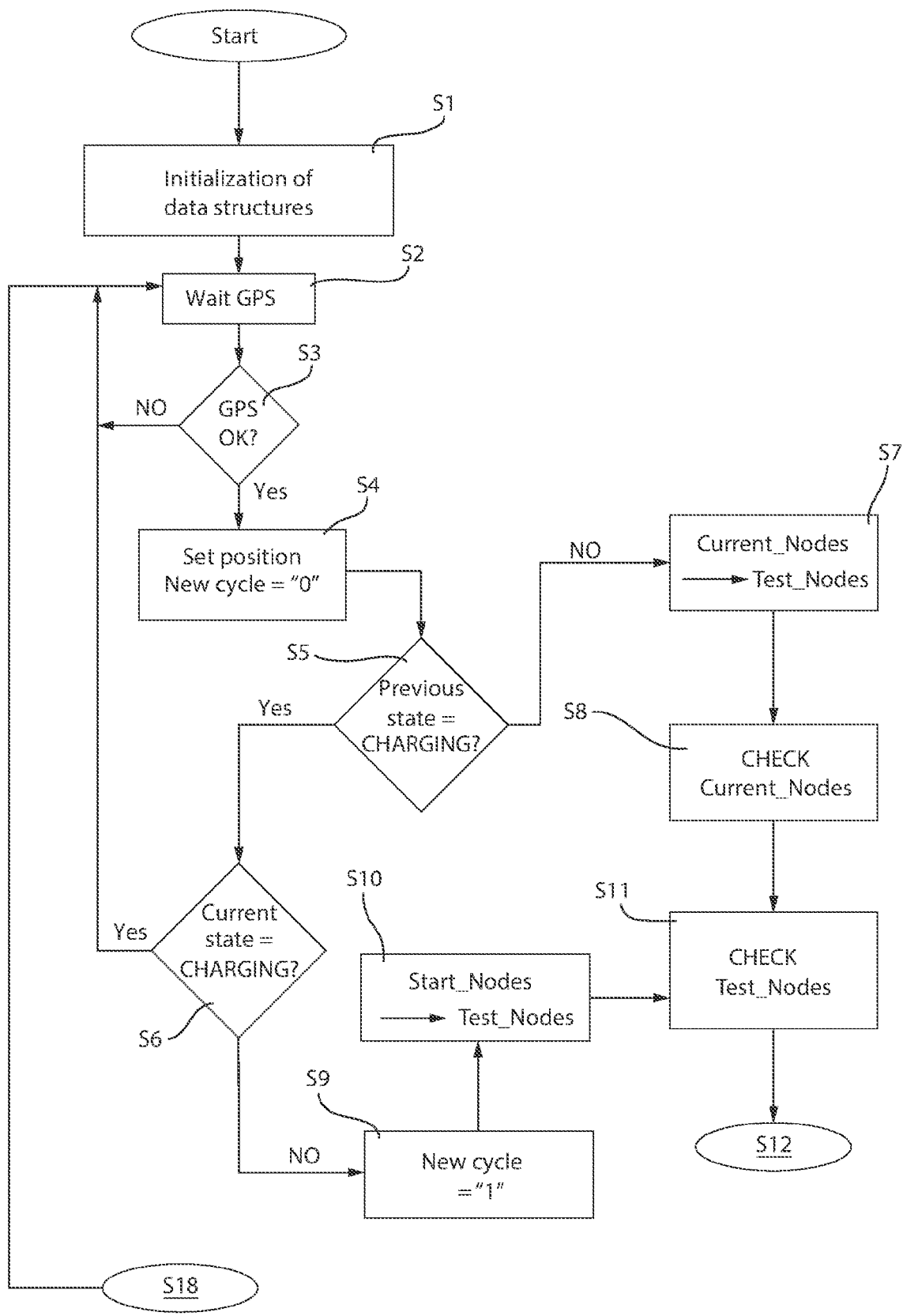
FIGS. 4A and 4B show, by means of a block diagram, a method for the creation and the travelling of a data structure (graph) for assisting in the electric energy management of the vehicle of FIG. 1, according to the invention.
Figure 4B:
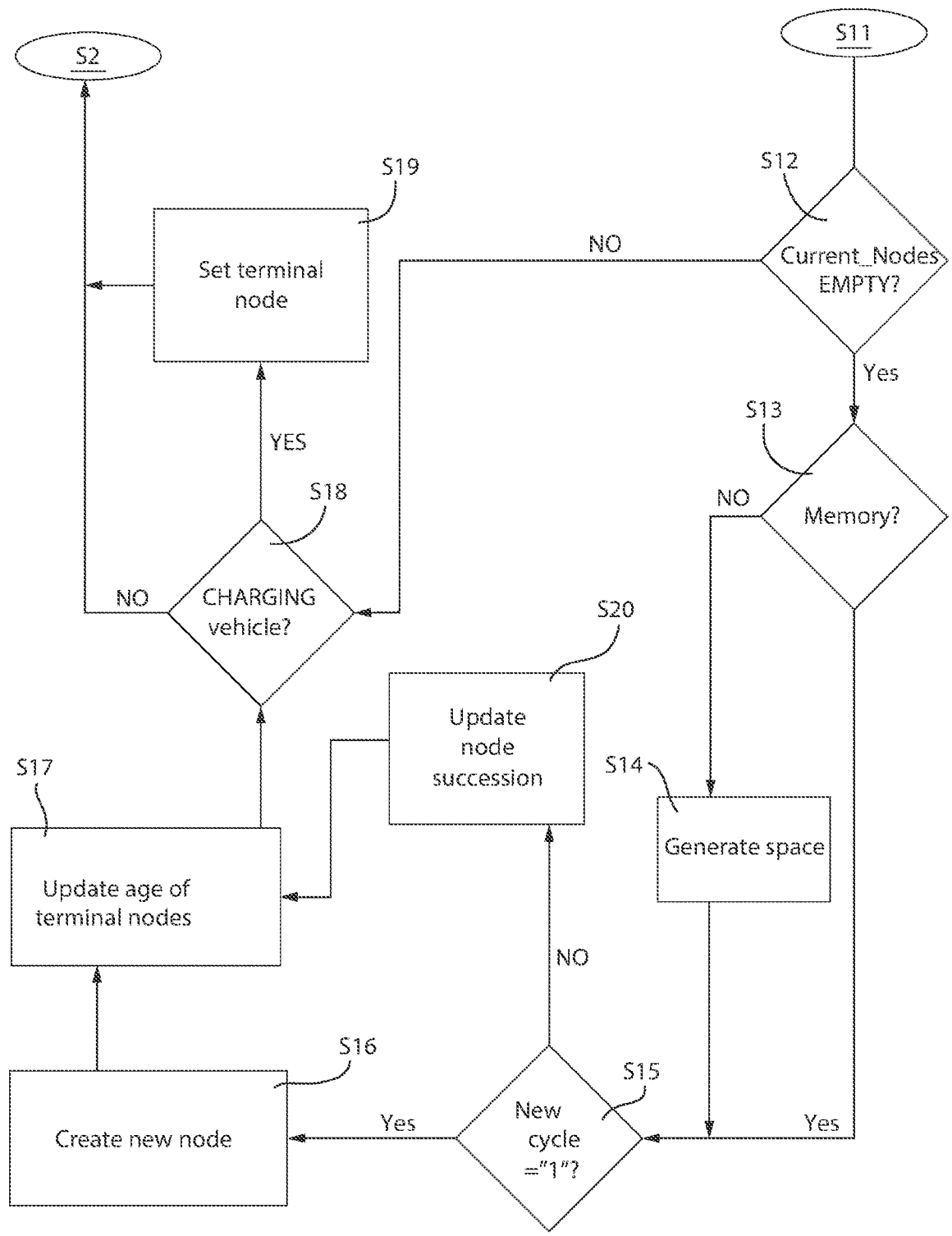

The age field "a" contains the age of the node, which, for the terminal nodes (in the example of FIG. 2, nodes N6 and N9), is increased during the building of the graph (step S17 of FIG. 4B). This field is optional.

The consumption field "c" contains the energy consumption (in particular, the consumption of the batteries of the vehicle 10 while driving) starting from the last charge. Hence, this field identifies how much the vehicle has consumed to reach it. This field can be present only in some nodes (for example, in the sole terminal nodes).

Furthermore, in this description, further data structures are used, which can also be implemented via software (e.g. in the form of lists), such as: Current_Nodes, Devalidated_Nodes, Test_Nodes. Each one of the aforesaid data structures contains or includes one or more pointers to nodes N0-N9 of graph 1 and can be implemented, for example, as a list. Therefore, the addition of a node to one or more of these data structures does not involve the creation of a new node, but the creation of a pointer or reference to the node taken into account.

The data structure called "Current_Nodes" relates to the nodes of graph 1 which can be associated with the current position of the vehicle 10 provided by the GPS receiver 12. Even though, in general, there is only one node associated with the current position of the vehicle 10, two (or more) modes can spatially be so close to one another that the intrinsic error of the GPS position does not make it possible to distinguish, between them, which one corresponds to the real position of the vehicle 10.

The data structure called Devalidated_Nodes relates to the nodes of graph 1 that were assigned to the data structure "Current_Nodes" and that, based on the updated GPS coordinates of the vehicle 10, cannot be associated any longer with the current position of the vehicle 10 (for example, because the vehicle 10 moved).

The data structure called Test_Nodes relates to the nodes of graph 1 towards which the vehicle 10, starting from the node (or the nodes) associated with the current position, could be directed. This data structure is configured to store references/pointers to successor nodes following the nodes associated with the current position ("Current_Nodes"), up to the N-th level (chosen during the designing phase), as better described below.

FIGS. 4A and 4B show, by means of a block diagram, steps of a method for the creation, the update and the navigation of graph 1, according to an embodiment of the invention.

The steps for the generation of graph 1 are optional, as, in a possible embodiment of the invention, graph 1 can be stored in the memory of the vehicle 10 in a final form (already built) and be used by the vehicle 10 for the navigation.

The method described herein uses some further variables or data structures, in particular:

- a variable Current_Position, which is used to store the GPS coordinates of the last detected position (namely, the current coordinates of the vehicle 10 during use);
- a data structure Start_Nodes, in particular implemented as list, which is configured to contain references to nodes that, based on the GPS coordinates detected as soon as the vehicle is unplugged from the charge inlet and starts driving, could be start nodes (this variable is used when a graph already exists and a new branch is being created);
- a variable New_Driving_Cycle, which is indicative of the fact that the vehicle just started moving after a charge; in other words, the variable New_Driving_Cycle is indicative of the fact that the current node is a start node, namely without antecedent nodes (for instance, this variable is a binary variable, in which New_Driving_Cycle="0" is indicative of the fact that the current node is not a start node and in which New_Driving_Cycle="1" is indicative of the fact that the current node is a start node);
- a variable Vehicle_Previous_Status indicative of the state of charging vehicle (Vehicle_Previous_Status="1") at a time instant prior to the current assessment instant (for example, this variable is maintained at the logic value "1" as long the vehicle 10 is charging, whereas it is set to the value "0" when the vehicle is unplugged from the charging power supply).
- a variable Vehicle_Current_Status, which is indicative of the state of charging vehicle (Vehicle_Current_Status="1") at a current assessment instant (for example, this variable is maintained at the value "1" as long the vehicle 10 is charging, whereas it is set to the value "0" when the vehicle is unplugged from the charging power supply).

An explanatory condition of creation of a start node (here, node N0) of graph 1 will be described below.

Creation of a Start Node

With reference to step S1, the data structures Current_Nodes, Devalidated_Nodes and Test_Nodes are initialized as "empty", namely they do not contain any reference to existing nodes.

Furthermore, in this initial step, the vehicle 10 is assumed to be in a charging state. In order to take into account this condition, the two variables Vehicle_Previous_Status and Vehicle_Current_Status are initialized at the logic value "1" indicative of the charging vehicle both at the current time instant and at a time instant immediately preceding the current one (the initialization value can obviously be chosen in a free manner, according to standards set during the designing phase).

Then, step S2, current position coordinates of the vehicle 10 are acquired by means of the GPS 12. In the absence of a GPS signal, the method remains in this step S2 as long as a valid GPS signal is detected (step S3).

Then, step S4, when valid GPS coordinates are detected, a start node of graph 1 is generated, for example node N0. The current GPS coordinates are stored in a temporary variable and then added to the position field p of node N0 during step S16, which is described below.

Furthermore, the data structure Current_Position is updated by storing the GPS coordinates detected during steps S2/S3, so that the data structure Current_Position stores the current position of the vehicle 10 (in this case, corresponding to field p of node N0).

The data structure Devalidated_Nodes is initialized at a zero value, namely cancelling the prior content thereof.

The variable New_Driving_Cycle is pre-set by default to the logic value "0" and is subsequently updated, if needed, namely in case the vehicle is in a new driving cycle (step S9 described below).

Then, step S5, the state of the vehicle is checked, in terms of charging or non-charging vehicle 10, at a time instant prior to the assessment one according to step S5. In other words, the vehicle is controlled in order to check whether it was or was not connected to a charging station to charge the batteries. If positive, step S6 is carried out so as to check whether the vehicle is still charging. In case the vehicle 10 is still charging, the diagram goes back to step S2.

Back to step S5, output NO (the vehicle was not charging at a prior instant) leads to step S7. The operations of step S7 will not be described in detail here because they are not carried out during the initial building of graph 1 (they are operations that have to be carried out on the data structure Current_Nodes, which, though, is an empty list at the moment graph 1 is initially built).

Then, step S7 leads to step S8; step S8 is not carried out during the creation of the start node of graph 1 either and, therefore, it will not be described right away.

Back to step S6, output NO leads to step S9, in which the variable New_Driving_Cycle is set to the logic value "1". As a matter of fact, the input of step S9 is accessible only in case (i) the vehicle was actually charging at the assessment instant of step S5; and (ii) the state of the vehicle 10 assessed during step S6 was vehicle no longer charging. Hence, it can be assumed that the vehicle 10 started a new use cycle (namely, is being used by the driver).

The output of step S9 leads to step S10, whose operations are not carried out during the initial creation of graph 1, since the data structure Start_Nodes is empty, as well, during this step.

Then, step S10 leads to step S11. Step S8, which was previously discussed, leads to step S11, as well.

The operations of step S11 are not carried out during the initial building of the graph, since the data structures evaluated during this step are empty. Then, step S12 is carried out in order to assess whether the data structure "Current_Nodes" contains a reference to one or more nodes of graph 1 that can be associated with the current position of the vehicle 10. In the case being examined, namely relating the initial building of the graph, this data structure is empty, since that is how it was initialized during step S1.

Then, step S13 is carried out in order to assess whether the available memory is sufficient to contain a new node of graph 1. If negative (there is no sufficient memory), step S14 is carried out, during which old data structures, or data structures that are no longer used, are cancelled. The age field "a" of the terminal fields is used as age reference of the relative branch of graph 1. The cancellation of a terminal node leads to the consequent recursive cancellation of all nodes connected to it, until a "junction" node is reached, namely a node having more than one successor. In the example of FIG. 4A/4B, the possible cancellation of terminal node N6 leads to the consequent cancellation of nodes N5, N4 and N3, stopping at node N2 (which is not cancelled) for it is provided with a further successor node (node N7).

In case the check of step S13 produces a positive result (there is a sufficient memory), step S15 is carried out, during which the content of the variable New_Driving_Cycle is checked. If New_Driving_Cycle="1", like in the case being examined, step S16 is carried in order to create a new node of graph 1 (e.g. node N0). Node N0 is created during this step and the relative fields of node N0 are set, in particular the position field p is updated to the GPS coordinate value acquired during step S4. The remaining fields f1, f2 are set to a default value indicative of the absence of a prior node and a successive node. The termination field t is set to a value indicative of the fact that node N0 is not a termination node. The data structure Start_Nodes is updated inserting the reference to node N0, which is considered a start node, since it was the first node created after a charging step. The data structure Current_Nodes is updated, as well, inserting the reference to node N0.

Then, step S17 is carried out, whose operations are not performed in this context. In step S17, when in graph 1 there are terminal nodes (in FIG. 2, nodes N6 and N9), the age field a of all terminal nodes is increased by a predetermined value (for instance, by 1 unit). Step S17 is carried out only after the addition of a new node to graph 1. This step is optional and has the function of permitting a quick detection of older paths, which can be eliminated in case memory space needs to be cleared in order to build new paths (steps S13-S14).

Then, step S18 is carried out in order to check whether the vehicle 10 is charging at the current time instant. If positive, step S19, the last node created (in the example described so far, node N0) is set as terminal node, properly updating the termination field t of node N0 and the consumption field c. Then, step S19 leads to step S2.

However, in a typical condition, the creation of one single node does not lead to step S19, since the vehicle 10 (which was just charged) is not charged again at the assessment instant of step S18. Output NO of step S18 leads to step S2, which was described above, and then the steps for the creation of a new node (N1) are carried out.

The description below deals with an embodiment relating to the population of graph 1 starting from a condition in which graph 1 already exists (at least one node Ni was created) and further nodes of the graph have to be created.

Addition of Further Nodes (N2-N6)

As mentioned above, step S18 leads back to step S2. Steps S2 and S3 correspond to what already described above. In particular, the vehicle 10 moved relative to the previously acquired GPS position and the current GPS coordinates are detected and acquired in order to be stored in the data structure Current_Position. These coordinates correspond, in this example, to the ones associated with node N1, which is going to be created.

With reference to step S4, the variable New_Driving_Cycle is initialized at the logic value "0", indicating that the current node is not a start node, New_Driving_Cycle="1" being indicative of the fact that the current node is a start node. The strategy used is that of initializing this variable at the value "0" and of setting it to "1" only in case a new driving cycle is carried out.

Step S5 produces negative outcome (output NO), since the vehicle 10 was already being used before. Then, step S7 is carried out, whose operations are not performed in this context. As a matter of fact, in this step, CurrentNodes only contains the reference to node N0 (which was created during step S16 upon first iteration), but node N0 still has no successors.

Step S7 leads to step S8, which involves checking whether the node currently stored in the data structure Current_Nodes is at a physical distance (in metres or feet, for example as the crow flies or along the road) that is greater than a threshold value K1. This check is performed carrying out a measurement of the distance between the geographical points identified by the GPS coordinates of node N0 and the ones stored in Current_Position. For example, K1 is set to 100 metres. If the threshold distance K1 is exceeded, this means that the vehicle 10 actually moved from the previous node N0 (namely, the vehicle 10 is moving). In this case, the reference to node N0 is eliminated from the data structure Current_Nodes and is moved to the data structure Devalidated_Nodes. Hence, the data structure Current_Nodes is empty.

Then, step S11 is carried out, whose operations are not performed in this context.

Then, step S12 involves checking whether the data structure Current_Nodes is empty. In this example, this assessment produces a positive result, which leads to step S13 and, if necessary, to step S14, which have been already described above.

Then, step S15 is carried out, whose output, in this context, is negative (indeed, the variable New_Driving_Cycle has the logic value "0", which was set during step S4).

Then, step S20 is carried out in order to create a new node N1. The position field p of the new node N1 is updated to the value of the current GPS coordinates, as stored in Current_Position. The antecedent field f1 of node N1 is updated with a reference (pointer) to node N0, which is stored in the data structure Devalidated_Nodes. The successor field f2 of node N0 is set to a predetermined value indicative of the absence of successor nodes. Furthermore, the successor field f2 of node N0 is updated, storing a reference (pointer) to node N1. By so doing, a connection (in particular, a "father/son" or "antecedent/successor" connection) is created between nodes N0 and N1.

Then, step S17 is carried out, whose operations are not performed in this context, since terminal nodes do not exist yet in this step.

This leads to step S18 and, if necessary, to step S19, carrying out the operations and assessments already described above, in order to go back to step S2.

The steps described for the creation of node N1 are then repeated for the creation of all nodes N2-N6 and, therefore, are not described again.

Node N6 is, in this example, a terminal node. The setting of node N6 as terminal node takes place during step S18, whose execution determines that the vehicle 10 is charging. In this case, step S18 leads to step S19, in which node N6, which was created over the course of the previous step S16 during the corresponding iteration of the method described herein, is identified as terminal node, properly setting the termination field t of node N6. The consumption c of node N6 is updated setting the power consumption value registered starting from the last charge, namely, in the example taken into account, the power consumption registered from node N0 to node N6 or, in other words, the consumption registered by the vehicle 10 by travelling the branch of graph 1 from node N0 to node N6.

The steps described above are carried out—in a similar manner, which, hence, does not need to be described any further—for the creation of the further nodes N7-N9 of graph 1.

Travelling (Navigation) of the Nodes of the Graph

Now the method for travelling the nodes of graph 1, during the use of the vehicle 10, will be discussed.

Reference will be made, again, to FIGS. 4A and 4B. Step S1 is carried out in order to initialize the building of a new graph, only once for the entire useful life of the vehicle 10. Since step S1 is not carried out every time the vehicle 10 is turned on, these operation are not deemed interesting in the context of how to travel the nodes of graph 1.

In steps S2 and S3, the GPS receiver of the vehicle 10 acquires the GPS signal and, hence, the geographical coordinates of the vehicle 10. The vehicle 10 is assumed to start from node N0: in this case, the geographical coordinates that were just acquired correspond, barring an error of the geolocation system used, to the ones stored in the position field p of node N0.

Then, step S4 is carried out, during which the data structure Current_Position is updated in order to store the GPS coordinates acquired during step S3. In addition, the content of the data structure Devalidated_Nodes is cancelled and the variable New_Driving_Cycle is pre-set to the logic value "0".

This leads to step S5, which, in this example, produces a positive result, leading to step S6. Step S6 has a positive outcome (the vehicle 10 is in driving mode), leading to step S9, in which the variable New_Driving_Cycle is set to the logic value "1".

Then, step S10 is carried out, during which the content of the data structure Start_Nodes is copied to the data structure Test_Nodes. As previously mentioned with reference to the creation of node N0, step S16, the data structure Start_Nodes contains a list of nodes considered as path beginning nodes. In this case, the sole node present in Start_Nodes is node N0 (or, better said, a reference or pointer to node N0).

During step S10, again, the node immediately following node N0 (namely, node N1 pointed by the successor field f2) and, optionally, further successor nodes in the connection chain defined by graph 1 are copied to the data structure Test_Nodes. For example, the references of all nodes following node N0 up to the j-th level (wherein j is freely chosen during the designing phase, in order to balance the performances of the algorithm with computing capacity and available memory) can be inserted into Test_Nodes. Taking into account graph 1 of FIG. 2, if j=2, the references to nodes N1 and N2 are inserted into Test_Nodes; if j=3, the references to nodes N1, N2, N3 and N7 are inserted into Test_Nodes; if j=4, the references to nodes N1, N2, N3, N4, N7, and N8 are inserted into Test_Nodes, and so on.

Then, step S11 is carried out. Step S11 entails calculating, for each node whose reference was inserted into the data structure Test_Nodes, the distance between said node (using the GPS coordinates stored in the relative position field p) and the GPS coordinates stored in the data structure Current_Position during the previous step S4 (namely, the current position of the vehicle 10). The calculated distance is the geographical distance (in metres or feet, for example as the crow flies or along the road) between the two positions defined by the aforesaid GPS coordinates.

If said calculated distance is greater than a threshold distance K2 (for example, pre-set at 150 metres), the relative reference to the node taken into account is removed from the data structure Test_Nodes. If, on the other hand, said calculated distance is smaller than a threshold distance K3 (for example, pre-set at 50 metres), the relative reference to the node taken into account is inserted into the data structure Current_Nodes.

If the calculated distance is between K2 and K3, the relative reference to the node taken into account is not removed and remains in Test_Nodes.

In other words, step S11 can be explained as follows. If the vehicle 10 is too far away from a node stored in Test_Node, this means that the vehicle 10 is moving along another direction/another path; if, on the other hand, the vehicle 10 is too close to a node stored in Test_Node, said node becomes a current node. If neither of the two conditions applies, no operations for the removal/addition of nodes from/to the data structures mentioned above are carried out.

In this case, starting from N0 (whose coordinates in the position field p correspond to the coordinates inserted into Current_Position), the check on threshold K3 produces a positive result and node N0 is not inserted into the data structure Current_Nodes.

This leads to step S12, which involves checking whether the data structure Current_Nodes is empty or contains a reference to a node.

If the data structure Current_Nodes is empty, this means that the node taken into account during the previous step S11 has a distance from the GPS coordinates stored in the data structure Current_Position that is greater than K2 and no node previously stored in graph 1 corresponds to the current position of the vehicle 10. It is, in this case, a new position (a new node), which is not present in graph 1 yet. This leads to the steps, already described above, for the addition of a new node (steps starting from step S13 in the block diagram of FIG. 4A/4B).

On the other hand, if the check of step S12 confirms that the data structure Current_Nodes contains a reference to a node, step S18, which has been already described above, is carried out and, assuming that the vehicle is not charging because it just started, this leads back to step S2.

Hence, a new iteration of the steps of FIG. 2 begins. The vehicle 10 is assumed to have moved to a new geographical position (acquired during step S3) and this geographical position (GPS coordinates) is assumed to have been inserted into the data structure Current_Position (step S4). The check of step S5 now produces a negative outcome, since the vehicle 10 was not previously charging. This leads to step S7, during which, for each node in Current_Nodes (here, only node N0), the node immediately following node N0 (namely, node N1 pointed by the successor field f2) and, optionally, further successor nodes in the connection chain defined by graph 1 are copied to the data structure Test_Nodes. For example, similarly to what described with reference to step S10, the references of all nodes following node N0 up to the j-th level (wherein j is freely chosen during the designing phase) can be inserted into Test_Nodes. Taking into account graph 1 of FIG. 2, if j=2, the references to nodes N1 and N2 are inserted into Test_Nodes; if j=3, the references to nodes N1, N2, N3 and N7 are inserted into Test_Nodes; if j=4, the references to nodes N1, N2, N3, N4, N7, and N8 are inserted into Test_Nodes, and so on.

This leads to step S8, which involves checking whether the node currently stored in the data structure Current_Nodes is at a physical distance (in metres or feet, for example as the crow flies or along the road) that is greater than the threshold value K1. This check is performed carrying out a measurement of the distance between the geographical points identified by the GPS coordinates of node N0 and the ones stored in Current_Position (namely, the coordinates of node N1, assuming that the vehicle 10 moved to N1). If the threshold distance K1 is exceeded, this means that the vehicle 10 actually moved from the previous node N0 (namely, the vehicle 10 is moving). In this case, the reference to node N0 is eliminated from the data structure Current_Nodes and is stored in the data structure Devalidated_Nodes. Hence, the data structure Current_Nodes is empty.

This leads to step S11, which has been already described above. The check by means of thresholds of step S11 confirms, in this example, that the vehicle 10 is at node N1 and, therefore, the latter (or, better said, a reference to N1) is stored in the data structure Current_Nodes.

The check of step S11 is carried out for each node present in the data structure Test_Nodes. Those nodes that are too far away from the current position of the vehicle 10 (>K2) are removed from the data structure Test_Nodes. This step helps make the recognition of an already covered path more reliable even in the presence of small departures from said path, for example in order to take into account the possibility that the vehicle 10 (for example, travelling from N0 to N9) can take a short cut or depart from the path due to an unforeseen event and skip one or more nodes; the vehicle 10, for example, could directly travel from node N0 to node N7, avoiding nodes N1 and N2.

Then, the following steps from S12 forward are carried out, according to the description above.

Use of the Graph to Estimate Expected Consumptions

In order to estimate the energy needed until the next charge (battery capacity to complete the driving cycle), the processing unit 11 makes the relative calculation based on the information contained in graph 1 and taking into account, in particular, the consumption information "c" stored in all terminal nodes (nodes in which the vehicle ends the path and is charged) that can be reached starting from the current position. Since the vehicle 10 is in N1, for example, the possible branches are branch 1a and branch 1b and the nodes that can be reached are N6/N9. In this way, it is possible to determine whether the battery has a residual capacity that is sufficient to reach the terminal nodes N6/N9.

If it is established that the vehicle can reach the destination or the planned charging point, the driving plan can be carried out without further warning messages (if necessary, providing the driver with a positive feedback in that regard). If it is established that the vehicle 10 cannot reach the destination or planned charging point, warning information is offered to the driver, for example by means of an acoustic or visual signal, indicating that he/she needs to re-set the driving plan or make an intermediate stop to charge. In this case, it is also possible to show information concerning the maximum distance that can be travelled with the current charge of the batteries. As a consequence, the driver can make his/her on decisions on the expected or planned driving path or plan. In this case, it has been taken for granted that the vehicle knows the desired destination and, hence, based on the graph, is capable of establishing whether it can reach it or not.

The above can be generalized taking into account that the navigation of graph 1 produces, in general, a consumption prediction based on past data, even in the absence of a destination known at a given instant. Hence, if the destination is known, graph 1 can be used to determine whether the destination can be reached; if, on the other hand, the destination is not know, graph 1 can anyway be used to estimate, based on past data, the expected consumption of energy. In other words, in the absence of a known destination, the method produces, as an output, a consumption value calculated as probability distribution of possible destinations. In particular, the method produces, as an output, a statistical description of the consumption to be expected based on historical path/consumption data (stored by means of the graph) and on the path currently travelled form the last charge.

By way of example, take into account graph 1 of FIG. 2 and assume that the path from N0 to N9 was travelled a number of times amounting to eight, whereas the path from NO to N6 was covered six times (each consumption being stored in field "c" of the respective terminal node N9 or N6). Should the vehicle 10 find itself, during a new driving cycle, along the branch portion from N0 to N2, even though the destination is not known, the consumption can statistically be estimated as the probability of ending the path in N9 (namely, 8/(8+6)) multiplied by the mean consumption registered in N9 (mean of the "c" fields of node 9) and as the probability of ending the path in N6 (namely, 6/(8+6)) multiplied by the mean consumption registered in N6. A possible output would be, for example, 57% of probabilities of consuming 13 kWh and 43% of probabilities of consuming 16 kWh. In a variant of the invention, this calculation can generate one single output, thus creating a weighted mean of consumptions. In the case of the example mentioned above: 13*0.43+16*0.57=14.7 kWh.

Downstream of the aforesaid calculation, if the control unit 11 detects that the battery has a greater capacity than needed, in case of a hybrid vehicle, it could be possible to choose a preferential use of the electric charge compared to fuel.

If, while travelling along a branch (e.g. branch 1a) of graph 1, the vehicle 10 changes route, hence moving to a different branch (e.g. branch 1b), the information concerning the possibility of reaching the new terminal node as well as the total consumption estimate are updated accordingly.

In addition or alternatively to the display of the aforesaid information (and/or generation of an acoustic signal), the control unit 11 can further implement specific consumption or energy management settings, which are such as to optimize energy consumption and allow the vehicle 10 to reach the planned destination (terminal node).

Hence, specific settings for the use of the motor and/or of the auxiliary loads of the vehicle 10 can automatically be activated or suggested to the driver when it is established that the vehicle 10 cannot reach the destination or the planned charging point, in order to optimize the use of the battery, saving power.

While driving, the estimation of the current position of the vehicle 10 takes place by carrying out steps S2-S3 of FIG. 4A and it is updated with every iteration of the method described herein, in cycles following one another over time, using the GPS 12. The invention does not require the use of a geographical map with indications of the routes that can actually be covered, but is exclusively based on the identification of the position relative to the position data (nodes) of graph 1. Therefore, cartographic items of information or maps are not needed.

Furthermore, in order to establish whether the terminal node with charging point can be reached, the processing unit 11 calculates and determines, with every iteration of the steps of the method of FIGS. 4A and 4B, whether the vehicle can reach the planed destination in response to every possible change in the remaining distance data and in response to possible changes in the residual capacity of the batteries. If the results of this determination indicate that the destination cannot be reached, the items of information offered to the driver and/or the automatic consumption settings are updated accordingly. For example, the driver can be advised to reach a terminal node that is different from the one belonging to the branch of the graph that is being covered, but is close to it or in the proximity of a node (still to be reached) of the branch that is being covered, thus planning an intermediate charge in a terminal node that can be reached by the vehicle 10 with the current residual capacity of the battery.

Owing to the above, the advantages of the subject-matter of the invention are evident.

As mentioned above, the system and the method described herein and shown in the figures help and optimize the reaching of a planned destination by an electric vehicle, properly controlling the residual capacity of the batteries and implementing solutions to adjust their consumption to the path that is being covered.

Finally, the subject-matter of the invention can be subjected to changes and variants, which, though, do not go beyond the scope of protection set forth in the appended claims.

For example, the invention can be integrated with the typical technologies currently available in electric vehicles, which, upon braking, allow the braking energy to be used to generate power to charge the batteries, thus increasing the distance that can be covered by the vehicle.

Furthermore, even though explicit reference was made to a GPS system for the acquisition of the position of the vehicle 10, the invention also applies to the use of any geolocation system (for example, any GNSS "Global Navigation Satellite System").

Finally, even though the invention was explained, for the sake of simplicity and in order to make it clearer, with reference to graph 1 shown in FIG. 2, which has two branches 1a and 1b, the technical teach of the invention, as set forth in the appended claims, evidently applies to any graph containing any number of branches and nodes.

The invention claimed is:

1. A method for assisting in management of electric energy of a vehicle (10) of electric or hybrid type having batteries, including the steps of:
providing a graph (1) including a plurality of nodes (N0-N9) belonging to one or more branches (1a, 1b) of the graph (1), wherein each branch (1a, 1b) is associated with a respective road route that can be travelled by the vehicle (10) between a respective starting charging station (N0) and a respective arrival charging station (N6, N9), and wherein each branch (1a, 1b) is associated with respective information of an energy consumption that is required to travel the respective road route;
iteratively perform the following steps i)-vi):
i) acquiring current geographical coordinates of geopositioning of the vehicle (10);
(ii) identifying, on the graph (1), a node geographically closer to said current geographical coordinates;
iii) identifying, on the basis of said node closest to the current geographical coordinates, a traveled branch of the graph (1) upon which the vehicle (10) is travelling;
(iv) acquiring the energy consumption information associated with the traveled branch upon which the vehicle (10) is travelling;
v) checking whether a current electrical charge of the vehicle batteries (10) of the vehicle allows the vehicle (10) to reach the respective arrival charging station (N6, N9) of the traveled branch; and
vi) generating a feedback signal as a function of said verification;
wherein the step (vi) of generating the feedback signal as a function of said verification includes at least one step among:
generating an acoustic signal,
generating a visual signal,
controlling an energy supplied by the batteries of the vehicle (10),
controlling an energy absorbed by an electric motor of the vehicle (10),
controlling an energy absorbed by auxiliary loads of the vehicle (10), and
generating an estimate of the expected consumption until the next recharge.

2. The method according to claim 1, wherein step (i) of acquiring current geographic coordinates includes detecting and acquiring a signal from a global navigation satellite system, GNSS, such as a GPS.

3. The method according to claim 1, wherein each node (N0-N9) of graph (1) is a data structure including a position field (p) that stores geographic coordinates associated with the respective node (N0-N9),
the step (ii) of identifying, on the graph (1), the node geographically closest to said current geographic coordinates includes calculating a respective distance as the crow flies between the current geographic coordinates of the vehicle (10) and the geographic coordinates of each node (N0-N9) of the graph (1), and choosing, as the geographically closest node, the one whose calculated distance has the lesser value among all the calculated distances.

4. The method according to claim 3, wherein the step of choosing, as the geographically closest node, the one whose calculated distance has the lowest value among all the calculated distances further comprises comparing said distance having the lowest value with a predefined threshold and choosing such node at a shorter distance only if its distance from the current geographical coordinates is lower than the predefined threshold.

5. The method according to claim 1, wherein each node (N0-N9) is a data structure including an antecedent field (f1) and a successor field (f2), wherein the antecedent field (f1) stores a reference to an immediately preceding node in the path of the respective branch and the successor field (f2)

stores a reference to a immediately following node in the path of the respective branch, each branch being formed by a succession of nodes connected to each other through the respective fields antecedent (f1) and successor (f2).

6. The method according to claim 1, wherein step (iii) of identifying which branch of the graph (1) the vehicle (10) is traveling includes verifying to which branch (1a, 1b) the node geographically closest to the current geographical coordinates belongs.

7. The method according to claim 1, wherein each node is a data structure including a termination field (t) whose content identifies whether the respective node is a terminal node of the respective branch to which it belongs, said terminal node being associated with the arrival charging station (N6, N9) of the respective branch.

8. The method according to claim 7, wherein the data structure of each terminal node (N6, N9) also includes a consumption field (c) that stores an indication of the electricity consumption required by the vehicle (10) to travel the road route associated with the branch to which the terminal node (N6, N9) belongs, from the respective starting charging station (N0) to the respective arrival charging station (N6, N9).

9. The method according to claim 1, wherein the step of providing the graph (1) includes:

vii) acquiring, at a first temporal instant, current geographical coordinates of geo-positioning of the vehicle (10);

viii) checking if the vehicle (10) was, in a second time instant preceding the first time instant, in electric charging and:

in positive case, generating, at the first time instant, a first node associated to the starting charging station (N0), in negative case, generating, at the first temporal instant, a second node connected to the first node directly or through intermediate nodes belonging to the branch to which the second node belongs.

10. The method according to claim 9, wherein the step of providing the graph (1) further includes:

verifying whether, at the first time instant and after having generated the first or second node, the vehicle (10) is being electrically recharged and, if so, associate the said first or second node generated at the first time instant to the arrival charging station (N6, N9) of the respective branch.

11. A system for assisting in management of electric energy of a vehicle (10) of electric or hybrid type having batteries, including:

a memory configured to store a graph (1) including a plurality of nodes (N0-N9) belonging to one or more branches (1a, 1b) of the graph (1), wherein each branch (1a, 1b) is associated with a respective road route that can be travelled by the vehicle (10) between a respective starting charging station (N0) and a respective arrival charging station (N6, N9), and wherein each branch (1a, 1b) is associated with respective information of an energy consumption that is required to travel the respective road route;

a processing unit (11), configured to iteratively execute the following instructions i)-vi):

i) acquiring current geographical coordinates of geo-positioning of the vehicle (10);

(ii) identifying, on the graph (1), a node geographically closer to said current geographical coordinates;

iii) identifying, on the basis of said node closest to the current geographical coordinates, a traveled branch of the graph (1) upon which the vehicle (10) is travelling;

(iv) acquiring the energy consumption information associated with the traveled branch;

v) checking whether a current electrical charge of the vehicle batteries (10) allows the vehicle (10) to reach the respective arrival charging station (N6, N9) of the traveled branch;

vi) generating a feedback signal as a function of said verification, wherein the step (vi) of generating the feedback signal as a function of said verification includes at least one step among:

generating an acoustic signal, generating a visual signal, controlling an energy supplied by the batteries of the vehicle (10), controlling an energy absorbed by an electric motor of the vehicle (10), controlling an energy absorbed by auxiliary loads of the vehicle (10), generating an estimate of the expected consumption until the next recharge.

12. The system according to claim 11, further including a global navigation satellite system (12), GNSS, such as a GPS, configured to provide the processing unit (11) with current geographic coordinates of the vehicle (10).

13. The system according to claim 11, wherein each node (N0-N9) of the graph (1) is a data structure including a position field (p) that stores geographic coordinates associated with the respective node (N0-N9), and wherein instruction ii) of identifying, in graph (1), the node geographically closest to said current geographic coordinates includes calculating a respective distance as the crow flies between the current geographic coordinates of the vehicle (10) and the geographic coordinates of each node (N0-N9) of the graph (1), and choosing as the geographically closest node the one whose calculated distance has the lesser value among all the calculated distances.

14. The system according to claim 13, wherein the instruction to choose as the geographically closest node the one whose calculated distance has the lowest value among all the calculated distances also includes comparing said distance having the lowest value with a predefined threshold and choosing the node at a shorter distance only if the relative distance from the current geographical coordinates is lower than the predefined threshold.

15. The system according to claim 11, wherein each node (N0-N9) is a data structure including an antecedent field (f1) and a successor field (f2), wherein the antecedent field (f1) stores a reference to an immediately preceding node in the path of the respective branch and the successor field (f2) stores a reference to an immediately following node in the path of the respective branch, each branch being formed by a succession of nodes connected to each other through the respective fields antecedent (f1) and successor (f2).

16. The system according to claim 11, wherein instruction (iii) of identifying which branch of the graph (1) the vehicle (10) is traveling includes verifying to which branch (1a, 1b) the node closest to the current geographic coordinates belongs.

17. The system according to claim 11, wherein each node is a data structure including a termination field (t) whose content identifies whether the respective node is a terminal node of the respective branch to which it belongs, said terminal node being associated with the arrival charging station (N6, N9) of the respective branch.

18. The system according to claim 17, wherein the data structure of each terminal node (N6, N9) further includes a consumption field (c) that stores an indication of the electricity consumption required by the vehicle (10) to travel the road route associated with the branch to which the terminal node (N6, N9) belongs, from the respective starting charging station (N0) to the respective arrival charging station (N6, N9).

19. The system according to claim 11, wherein the instruction of providing the graph (1) includes:
  vii) acquiring, at a first temporal instant, current geographical coordinates of geo-positioning of the vehicle (10);
  viii) checking if the vehicle (10) was, in a second time instant preceding the first time instant, in electric charging and:
  in positive case, generating, at the first time instant, a first node associated to the starting charging station (N0),
  in negative case, generating, at the first temporal instant, a second node connected to the first node directly or through intermediate nodes belonging to the branch to which the second node belongs.

20. The system according to claim 19, wherein the instruction of providing the graph (1) further includes:
  verifying whether, at the first time instant and after having generated the first or second node, the vehicle (10) is being electrically recharged and, if so, associate the first or second node generated at the first time instant to the arrival charging station (N6, N9) of the respective branch.

21. A vehicle (10) of electric or hybrid type, including a system for assisting in management of electric energy according to claim 11.

22. A computer program product loadable in processing means (11) and designed so that, when executed, the processing means (11) become configured to perform the method according to claim 1.

23. The method according to claim 1, wherein the step (vi) of generating the feedback signal as a function of said verification includes at least one step among:
  controlling the energy supplied by the batteries of the vehicle (10),
  controlling the energy absorbed by the electric motor of the vehicle (10),
  controlling the energy absorbed by auxiliary loads of the vehicle (10).

* * * * *